(12) United States Patent
Chouinard

(10) Patent No.: US 10,508,768 B2
(45) Date of Patent: *Dec. 17, 2019

(54) TRUSS ADAPTER FOR MOUNTING OBJECTS ON SPACE FRAME TRUSS

(71) Applicant: Entertainment Structural Products, Inc., Essington, PA (US)

(72) Inventor: Michael P. A. Chouinard, Swarthmore, PA (US)

(73) Assignee: Entertainment Structural Products, Inc., Essington, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/108,278

(22) Filed: Aug. 22, 2018

(65) Prior Publication Data

US 2018/0356034 A1    Dec. 13, 2018

Related U.S. Application Data

(63) Continuation of application No. 15/612,041, filed on Jun. 2, 2017, now Pat. No. 10,077,868, which is a continuation-in-part of application No. 15/373,540, filed on Dec. 9, 2016, now abandoned, which is a continuation of application No. 14/700,087, filed on Apr. 29, 2015, now abandoned.

(60) Provisional application No. 61/986,038, filed on Apr. 29, 2014.

(51) Int. Cl.
| | | |
|---|---|---|
| *F16M 13/02* | (2006.01) | |
| *F21V 21/26* | (2006.01) | |
| *F16B 2/08* | (2006.01) | |
| *F16B 2/10* | (2006.01) | |
| *E04C 3/04* | (2006.01) | |
| *H04N 5/655* | (2006.01) | |
| *H04R 1/02* | (2006.01) | |

(52) U.S. Cl.
CPC ............ *F16M 13/027* (2013.01); *F16B 2/08* (2013.01); *F16B 2/10* (2013.01); *F21V 21/26* (2013.01); *E04C 2003/0495* (2013.01); *H04N 5/655* (2013.01); *H04R 1/026* (2013.01)

(58) Field of Classification Search
CPC ...... F16M 11/10; F16M 13/02; F16M 13/027; F16M 13/022; F16B 2/10; F16B 2/08; F21V 21/26; H04R 1/026; H04N 5/655; E04C 2003/0495
See application file for complete search history.

(56) References Cited

U.S. PATENT DOCUMENTS

| | | | | |
|---|---|---|---|---|
| 2,751,175 A * | 6/1956 | Jones | ........................ | F16L 3/24 248/72 |
| 3,559,941 A * | 2/1971 | Holzman | ............... | G01K 1/143 24/19 |
| 5,312,079 A * | 5/1994 | Little, Jr. | ................ | F16B 2/065 248/214 |
| 6,406,008 B1 * | 6/2002 | Dudding | ................ | B60G 9/003 248/228.1 |
| 6,561,471 B1 * | 5/2003 | Hawie | ................... | A01K 97/10 211/60.1 |
| 7,780,132 B1 * | 8/2010 | Tomaric | ................... | G09F 7/18 248/228.1 |

(Continued)

*Primary Examiner* — Jessie T Fonesca
(74) *Attorney, Agent, or Firm* — Olson & Cepuritis, Ltd.; William Oberhardt; Anita Cepuritis

(57) ABSTRACT

Devices for mounting objects on space frame truss or other structural members are provided.

19 Claims, 4 Drawing Sheets

(56) References Cited

U.S. PATENT DOCUMENTS

| | | | | |
|---|---|---|---|---|
| 2001/0030269 | A1* | 10/2001 | Evans | F16M 13/02 |
| | | | | 248/214 |
| 2002/0060280 | A1* | 5/2002 | Yaphe | E04B 9/006 |
| | | | | 248/317 |
| 2006/0254190 | A1* | 11/2006 | Hunt | E04B 9/006 |
| | | | | 52/698 |
| 2007/0235607 | A1* | 10/2007 | Liaw | F21V 21/088 |
| | | | | 248/218.4 |
| 2010/0200715 | A1* | 8/2010 | Kuipers | B62J 6/02 |
| | | | | 248/221.11 |
| 2011/0042536 | A1* | 2/2011 | Phillips | F16M 11/242 |
| | | | | 248/299.1 |
| 2014/0103181 | A1* | 4/2014 | Duerigen | F16M 11/041 |
| | | | | 248/289.11 |
| 2014/0191095 | A1* | 7/2014 | Le Gette | F16M 13/00 |
| | | | | 248/176.3 |

* cited by examiner

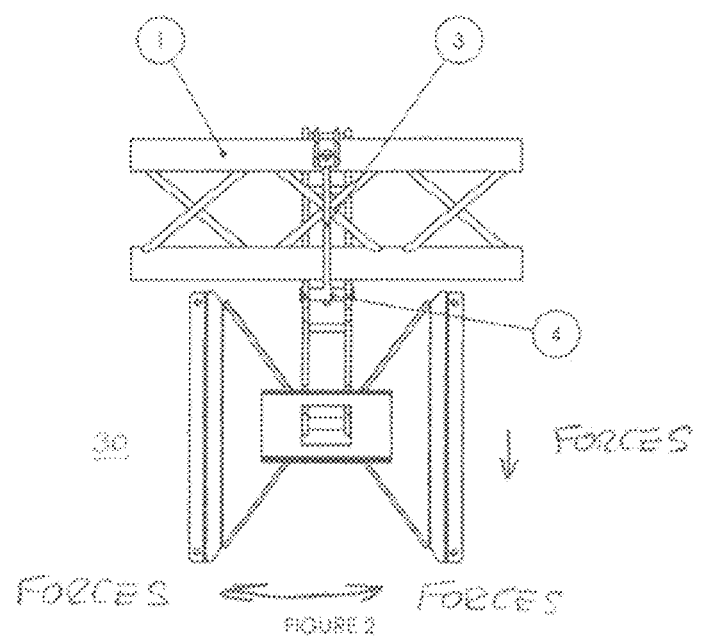

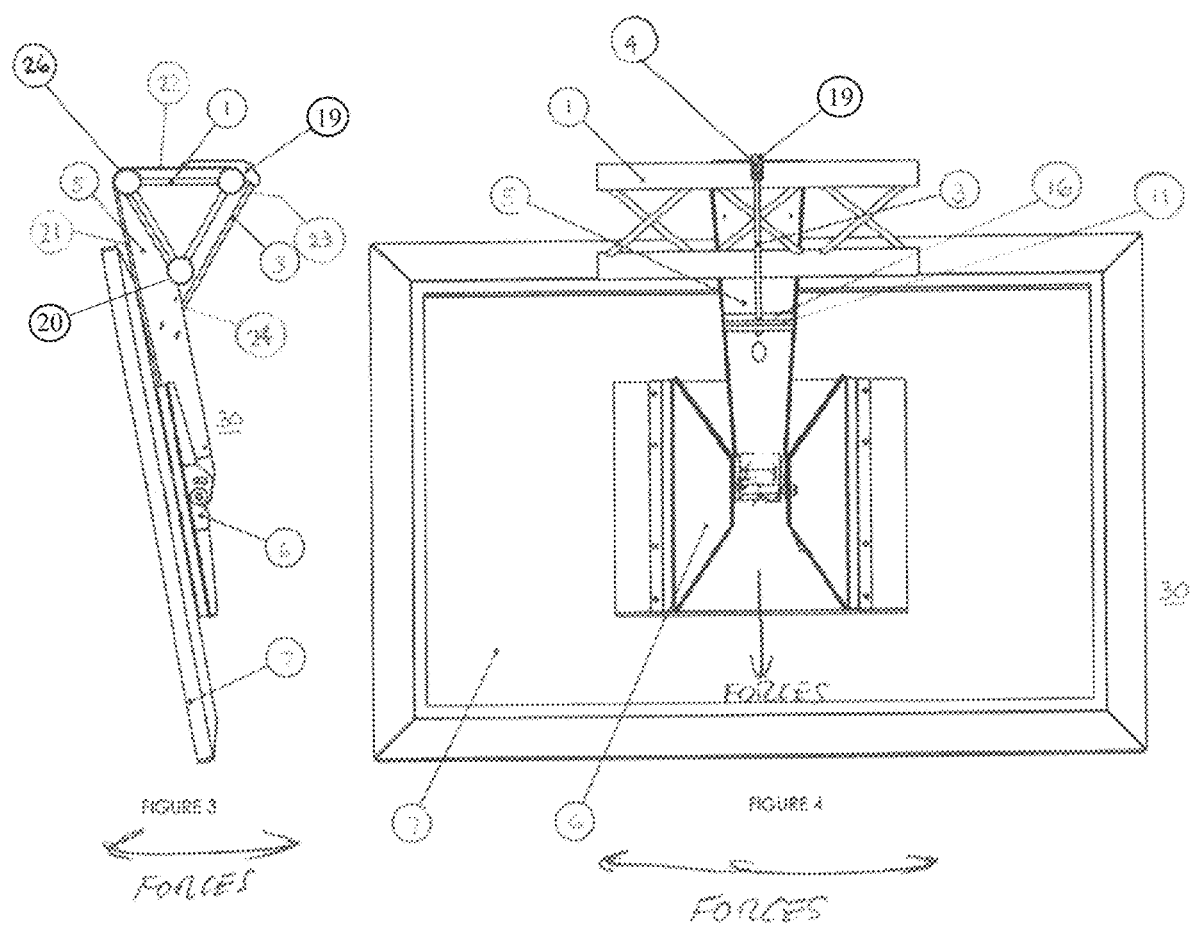

TRUSS ADAPTER FOR MOUNTING OBJECTS ON SPACE FRAME TRUSS

This application is a continuation of U.S. application Ser. No. 15/612,041, filed on Jun. 2, 2017, which, in turn, is a continuation-in-part of U.S. application Ser. No. 15/373,540, filed Dec. 9, 2016, abandoned, which, in turn, is a continuation of U.S. application Ser. No. 14/700,087, filed Apr. 29, 2015, abandoned, which, in turn, claims the benefit of and priority from U.S. provisional application Ser. No. 61/986,038, filed Apr. 29, 2014, all of the disclosures of which are incorporated herein by reference.

BACKGROUND OF THE INVENTION

The present invention relates to the field of hanging objects on truss. Tubular truss is used in the entertainment industry in both temporary and permanent rigging systems to hold lights, speakers, and other entertainment equipment. There is a need in the construction industry for safe ways to attach objects to truss.

BRIEF DESCRIPTION OF THE DRAWINGS

The features of the present invention are set forth with particularity in the appended claims. The present invention, both as to its organization and manner of operation, together with further objects and advantages thereof, may be best understood with reference to the following description, taken in connection with the accompanying drawings in which:

FIG. 2 is a front view of an embodiment of the present invention hanging on a piece of truss;

FIG. 3 is a side view of an embodiment of the present invention hanging on a piece of triangular truss;

FIG. 4 is a front view of an embodiment of the present invention hanging on a piece of truss.

DETAILED DESCRIPTION OF THE INVENTION

Figure 1:
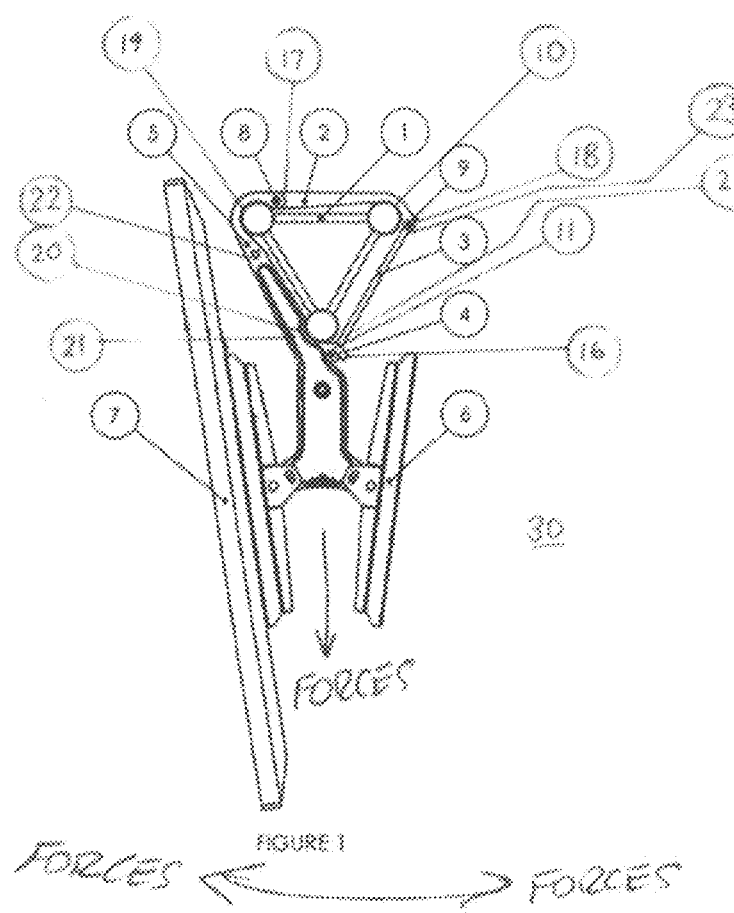
FIG. 1 is a side view of an embodiment of the present invention hanging on a piece of triangular truss.

The present invention is a device for mounting objects and coupling loads imposed by those objects to space frame trusses or beams in a manner which utilizes the full moment capacity in bending, shear and torsion of the space frame truss or other type of beam. The device in all of its embodiments entraps the cross section of the truss in such a way as to not locally load in torsion or local bending a truss chord or flange independent of the entire truss or beam structure.

Most truss mounts circumferentially clamp on a single truss chord with either a U-bolt or other type of circumferential clamp or a clamp which compresses on a flange of a beam. If a moment load is coupled through to the chord tube or flange through this attachment the local stresses in the tube or flange may become quite high as a result of the small length of engagement relative to the moment arm. This in combination with other stresses from bending or twisting of the structure that may be present become additive and cause unplanned local yielding of the structure.

Generally the choice is to hang loads from the lower truss chord or flange of a space frame truss or beam as it seems to be a convenient place to suspend a load. This may be the region of the highest tensile stress present in the structure as in triangular trusses which usually are oriented with a single chord in tension. This method can cause highly unpredictable stressing (local loading) of the structure and consequent sudden failure as an individual chord tube failure may cause a catastrophic and progressive failure of the whole structural element.

The devices of the present invention utilize the entire bending and moment capacity of the structural member as intended as the device is configured to wrap around the entire structural member and apply a light compressive load with the tensioning device present in the mount body. In this way the mount couples its loads in bending, twisting, and moment loading effectively through the entire cross section of the structural member.

A small preload applied to the tensioning device in the mount body allows a large moment loading to be applied to the mount body and coupled to the structural member without causing excessive loading of any individual truss chord.

The mounts of the present invention may be tightened so as to grip the cross section of the beam or truss so as not to slide along its length if the beam is of uniform cross section. The mount may also be loosened without removing and slid along the length to any desired position unless obstructed by some non-uniform cross sectional feature. Because the device wraps around the outer perimeter of the truss, the location of the device will not be impeded by any internal truss members.

The mounts of the present invention may be used to hang any object off of space frame truss or a beam. Objects include but are not limited to televisions, speakers, lights, or other trusses. The mounts of the present invention are also not sensitive to the orientation of the beam or truss.

FIG. 1 shows a mount (30) attached to a triangular truss (1). The mount (30) has a pivot arm (2) which contacts the chord of the truss (1) with a radiused pivot arm saddle feature (10), and pivots at first pivot (8) relative to the body (5) of the mount (30). Body (5) has a first portion (21) and a second portion (22), and a first body saddle (19) associated with the second portion (22) of the body (5) and a second body saddle (20) associated with the first portion (21) of the body (5). The pivot arm (2) has a first end (17) and a second end (18). Second pivot (9) is attached to the second end (18) of pivot arm (2). A tensioning device (3), such as a drawbolt, a ratcheting binder device, a cam, a screw, or other known instrumentalities is provided. The tensioning device (3) has a first end (23) and a second end (24). The first end (23) of tensioning device (3) is attached to second pivot (9) through known instrumentalities, such as a threaded connection. Tensioning device (3) thereby pivots at the second end (18) of pivot arm (2) at second pivot (9). It connects at the protruding second end (24) of tensioning device (3), which may include protruding nut (4), by engaging a receiving portion (16) of body (5), for example, a slot (11) in the body (5). This allows the mount (30) to be preloaded when tensioning device (3), such as a drawbolt, is tightened, such as, in the case of a drawbolt, by threading into nut (4) or second pivot (9) thereby tensioning the drawbolt (3) and pulling it into (toward) the end of the slot (11) in body (5). Bracket (6) is an adapter for attaching a television (7) to the body (5) of the mount (30).

FIG. 2 shows a mount (30) attached to a triangular truss (1). The tensioning device (3) and nut (4) are shown in the tightened configuration to demonstrate the communication of the working loads to the entire cross section of the truss (1).

FIG. 3 shows another embodiment of the present invention, which is an unarticulated mount (30) where the body (5) of the mount (30) is a sheet metal fabrication fit on a truss (1) with a first body saddle (19) rigidly attached to the sheet metal body (5) and a tensioning device (3), such as a drawbolt provides the necessary preload to secure the mount (30) axially on the truss (1). A body bend (26) is located between the first portion (21) of the body (5) and the second portion (22) of the body (5). This embodiment relies on the flexure of the sheet metal body (5) to partially conform to the shape of the truss (1). Bracket (6) is an adapter for attaching a television (7) to the body (5) of the mount (30).

FIG. 4 shows another view of an unarticulated mount (30) where the body (5) of the mount (30) is a sheet metal fabrication fit on a truss (1) with a saddle (19) rigidly attached to the sheet metal body (5) and a drawbolt (3) provides the necessary preload to secure the mount (30) axially on the truss (1), when tensioning device (3) is engaged with receiving portion (16). This embodiment relies on the flexure of the sheet metal body (5) to partially conform to the shape of the truss (1). Bracket (6) is an adapter for attaching a television (7) to the body (5) of the mount (30).

Figure 5:
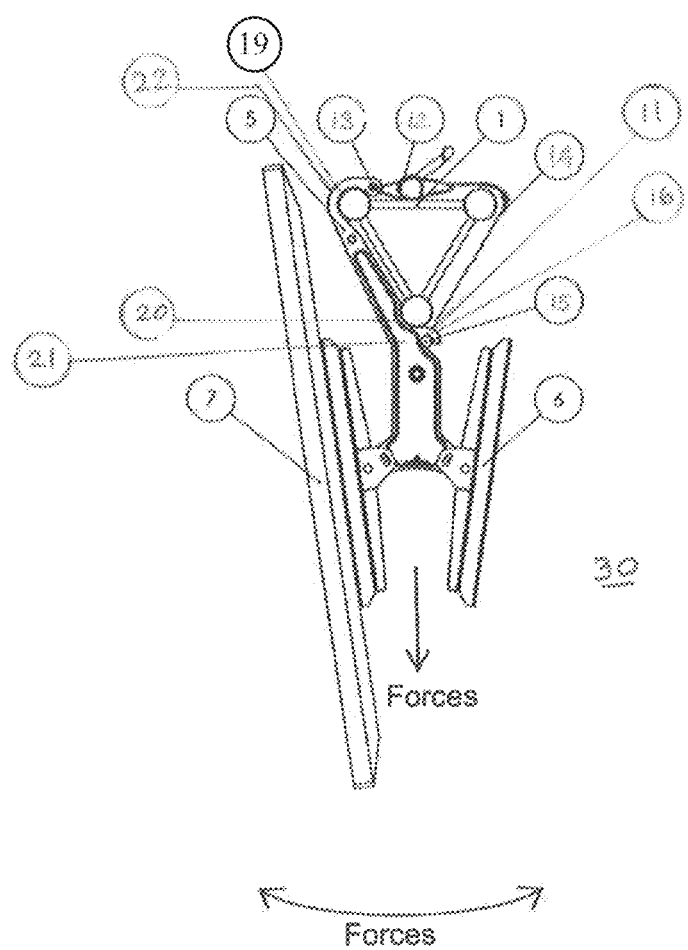
FIG. 5 is a side view of an embodiment of the present invention hanging on a piece of triangular truss.

FIG. 5 shows another embodiment of the mounts of the present invention wherein the body (5) of the mount (30) nests on the chord tubes of the truss (1), and the preload to restrain the body (5) of the mount (30) to the truss (1) is provided by a ratcheting binder apparatus (12) pivoting on a pin (13) through the body (5) thereby tensioning a flexible strap (14) which connects back to the body (5) at slot (11) via connector (15) which may be of any suitable geometry or method. Bracket (6) is an adapter for attaching a television (7) to the body (5) of the mount (30).

Various embodiments having been thus described in detail and by way of example, it will be apparent to those skilled in the art that variations and modifications may be made and still achieve the desired outcome. The embodiments described herein include all such variations and modifications as fall within the scope of the claims.

The invention claimed is:

1. A truss adapter for mounting one or more objects on a space frame truss having a plurality of truss chords that are interconnected by webbing, wherein each of the truss chords has an outer surface, the truss adapter comprising:
   (A) a body having a first body portion, a first body saddle engagable with the outer surface of a first truss chord of the space frame truss, a second body portion, a second body saddle engagable with the outer surface of a second truss chord, and a receiving portion;
   (B) a pivot arm having a first end portion and a second end portion, the first end portion of the pivot arm being pivotably attached to the second body portion;
   (C) a tensioning device that has a first end portion and a second end portion, the first end portion of the tensioning device being pivotably attached to the second end portion of the pivot arm and the second end portion of the tensioning device engaging the receiving portion of the body; and
   (D) a bracket attached to the body for attachment of one or more objects to the truss adapter.

2. The truss adapter of claim 1 wherein the one or more objects attachable to the bracket are selected from the group consisting of: televisions, speakers, and lights.

3. The truss adapter of claim 1 wherein the tensioning device is a drawbolt.

4. The truss adapter of claim 3 wherein the second end portion of the drawbolt is threadedly engageable with the receiving portion of the body.

5. The truss adapter of claim 3 wherein the first end portion of the drawbolt is threadedly engagable with the second end portion of the pivot arm.

6. The truss adapter of claim 3 wherein the second end portion of the drawbolt is threadedly engageable with the receiving portion of the body and the first end portion of the drawbolt is threadedly engagable with the second end portion of the pivot arm.

7. The truss adapter of claim 1 wherein the first body saddle has a radiused portion engageable with the outer surface of the first truss chord, and the second body saddle has a radiused portion engageable with the outer surface of the second truss chord.

8. The truss adapter of claim 3 wherein, when the truss adapter is mounted on the structural member, and when the tensioning device is engaged with the receiving portion of the body:
   (A) when the tensioning device is tightened, the tensioning device causes the body and the pivot arm to tighten relative to the space frame truss such that the truss adapter may not slide laterally along the space frame truss; and
   (B) when the tensioning device is loosened, the tensioning device causes the body and the pivot arm to loosen relative to the space frame truss such that the truss adapter may slide laterally along the space frame truss without removal of the truss adapter from the space frame truss and without interference of the truss adapter with the webbing of the truss.

9. A truss adapter for mounting one or more objects on a structural member having a contoured outer surface, the truss adapter comprising:
   (A) a body having a first body portion, a second body portion, and a receiving portion;
   (B) the first body portion being engagable with a portion of the contour of the outer surface of the structural member on which the truss adapter is to be mounted;
   (C) a first body saddle located on the second body portion, the first body saddle being engageable with a portion of the contour of the outer surface of the structural member on which the truss adapter is to be mounted;
   (D) a bracket attached to the body for attachment of one or more objects to the truss adapter;
   (E) a tensioning device that has a first end and a second end, wherein the second end of the tensioning device is engageable with the receiving portion of the body, and wherein the first end of the tensioning device is engageable with the first body saddle; and
   (F) the tensioning device is a drawbolt.

10. The truss adapter of claim 9 wherein
   the engagement between the second end of the drawbolt and the receiving portion of the body is a threaded engagement.

11. The truss adapter of claim 9 wherein
   the engagement between the first end of the drawbolt and the body saddle is a threaded engagement.

12. The truss adapter of claim 9 wherein
   the engagement between the first end of the drawbolt and the body saddle is a threaded engagement and
   the engagement between the second end of the drawbolt and the receiving portion of the body is a threaded engagement.

13. The truss adapter of claim 9 wherein the first body portion is made from flexible sheet metal.

14. The truss adapter of claim 9 wherein the one or more objects attachable to the bracket are selected from the group consisting of: televisions, speakers, and lights.

15. The truss adapter of claim 9 wherein, when the truss adapter is mounted on the structural member, and when the tensioning device is engaged with the receiving portion of the body:
   (A) when the tensioning device is tightened, the tensioning device causes the body to tighten relative to the structural member such that the truss adapter may not slide laterally along the structural member; and
   (B) when the tensioning device is loosened, the tensioning device causes the body to loosen relative to the structural member such that the truss adapter may slide laterally along the structural member without removal of the truss adapter from the structural member.

16. A truss adapter for mounting one or more objects on a structural member, wherein the structural member is a space frame truss having at least three truss chords interconnected by webbing, the truss adapter comprising:
   (A) a body having a first portion, a second portion, and a receiving portion, wherein the second portion of the body further comprises a first body saddle which is engageable with a first truss chord of the structural member on which the truss adapter is to be mounted;
   (B) the first body portion comprises a second body saddle which is engageable with a second truss chord of the structural member on which the truss adapter is to be mounted;
   (C) a ratcheting binder apparatus, the ratcheting binder apparatus being attached to the second portion of the body and further comprising a flexible strap having a terminus, wherein the ratcheting binder apparatus is capable of tensioning the flexible strap or loosening the flexible strap, and whereby the flexible strap is engageable with a third truss chord of the structural member on which the truss adapter is to be mounted;
   (D) a connector attached to the terminus of the flexible strap, wherein the connector is capable of engaging the receiving portion of the body; and
   (E) a bracket attached to the first body portion for attachment of one or more objects to the truss adapter.

17. The truss adapter of claim 16 wherein the one or more objects attachable to the bracket are selected from the group consisting of: televisions, speakers, and lights.

18. The truss adapter of claim 16 wherein, in operation, when the truss adapter is mounted on the structural member, and when the connector engages the receiving portion of the body:
   (A) the first body saddle engages with the first truss chord of the structural member;
   (B) the flexible strap wraps partially around the outer perimeter of the structural member, thereby engaging at least the second truss chord; and
   (C) the ratcheting binder may be tensioned to cause the body and strap to cooperate to grip at least the first truss chord, the second truss chord, and the third truss chord of the structural member so as to prevent the truss adapter from sliding laterally relative to the structural member or rotating relative to the cross-section of the structural member.

19. The truss adapter of claim 16 wherein, when the truss adapter is mounted on the structural member, and when the connector is engaged with the receiving portion of the body:
   (A) the ratcheting binder apparatus may be utilized to tension the flexible strap, causing the body and flexible strap to cooperate to tighten relative to at least the first truss chord, the second truss chord, and the third truss chord of the space frame truss such that the truss adapter may not slide laterally along the space frame truss; and
   (B) the ratcheting binder apparatus may be utilized to loosen the flexible strap, causing the body and flexible strap to cooperate to loosen relative to at least the first truss chord, the second truss chord, and the third truss chord of the space frame truss such that the truss adapter may slide laterally along the space frame truss without removal of the truss adapter from the space frame truss and without interference of the truss adapter with the webbing of the truss.

* * * * *